United States Patent Office 3,300,472
Patented Jan. 24, 1967

3,300,472
CYCLOPENTADIENYL NICKEL AZOBENZENE COMPOUNDS
Joseph P. Kleiman, Oak Park, and Michael Dubeck, Royal Oak, Mich., assignors to Ethyl Corporation, New York, N.Y., a corporation of Virginia
No Drawing. Filed Jan. 29, 1964, Ser. No. 341,111
11 Claims. (Cl. 260—149)

This application is a continuation-in-part of application Serial No. 190,821, filed April 27, 1962, and now abandoned.

This invention relates to novel organometallic compounds. More specifically, it relates to compounds of nickel which contain a cyclomatic radical and an azobenzene radical.

An object of this invention is to provide novel organometallic compounds. A further object is to provide novel compounds of nickel which contain a cyclomatic radical. Another object is to provide novel compounds of nickel which contain an azobenzene radical. Still another object is to provide a process for the formation of these novel compounds.

The objects of this invention are accomplished by providing novel organometallic compounds having the formula:

$$QNi(Q'—N=N—Q''—H)$$

wherein Q is a hydrocarbon cyclopentadienyl radical having from 5 to about 13 carbon atoms, Q' is a hydrocarbon phenyl radical, and Q'' is a hydrocarbon o-phenylene radical. Both Q' and Q'' can have from 6 to about 14 carbon atoms.

In other words, the objects of this invention are accomplished by providing organometallic compounds consisting of a nickel atom, a cyclomatic hydrocarbon radical, and an azobenzene radical, said cyclomatic hydrocarbon radical having the carbocyclic ring found in cyclopentadiene, from 5 to about 13 carbon atoms, and being free of acetylenic unsaturation; said azobenzene radical having an azo linkage, —N=N—, one valence of said linkage being satisfied by bonding of one of the nitrogen atoms therein to a hydrocarbon phenyl radical, the other valence of said linkage being satisfied by bonding of the other nitrogen atom to a hydrocarbon o-phenylene radical such that one valence of said o-phenylene radical is satisfied; each of said phenyl and o-phenylene radicals having from 6 to about 14 carbon atoms and being free of acetylenic unsaturation; said cyclomatic hydrocarbon radical being bonded to said nickel atom through all the carbon atoms in said carbocyclic ring, said azobenzene radical being bonded to said nickel atom by donation of the π-electrons in the nitrogen-nitrogen double bond of said azo linkage to said nickel atom, and by the remaining valence of said o-phenylene radical, such that said remaining valence is satisfied and said nickel atom has the electronic configuration of krypton.

The preferred compounds of this invention can be represented by the formula:

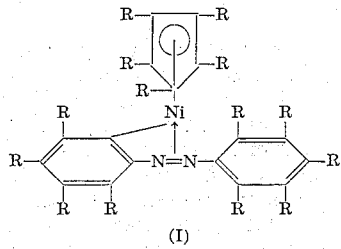

(I)

wherein the various R's are independently selected from the class consisting of hydrogen and hydrocarbon radicals having one to about 8 carbon atoms, such that the cyclopentadienyl radical contains from 5 to about 13 carbon atoms and the phenyl radical and the o-phenylene radical each contain from 6 to about 14 carbon atoms. As discussed below, other compounds of this invention have substituents on the cyclomatic and benzenoid rings other than hydrogen and hydrocarbon radicals. The circle within the cyclopentadienyl radical in the above formula illustrates that the cyclopentadienyl radical is π-bonded to the nickel atom. Hence, all of the carbon atoms within the cyclopentadienyl ring contribute to the bonding of the nickel atom or, in other words, the nickel atom is bonded to the cyclomatic radical through all the carbon atoms in the carbocyclic ring.

Because they are more readily available, the compounds of this invention which have at least one hydrogen atom bonded to the carbocyclic ring in the cyclopentadienyl radical are preferred. These compounds have the following formula:

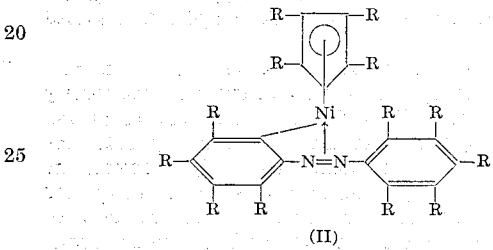

(II)

wherein the various R's have the same significance as in Formula I.

In preferred compounds of this invention, the radicals bonded to the ring carbons of the o-phenylene radical and the radicals bonded to the ring carbons of the phenyl radical are identical and are identically oriented about said phenyl and said o-phenylene radicals. In other words, the azobenzene radical in the preferred compounds of this invention is symmetrical.

Highly preferred compounds of this invention have a symmetrical azobenzene radical wherein the carbon atoms which are not bonded to the nickel atom and which are ortho to the azo linkage, are bonded to hydrogen. Furthermore, the radicals which are bonded to the carbon atoms meta and para to the azo linkage are independently selected from the class consisting of hydrogen and hydrocarbon radicals having from one to about 8 carbon atoms, said hydrocarbon radicals being selected from the class consisting of alkyl, cycloalkyl, aryl, alkaryl, and aralkyl radicals. The highly preferred compounds of this invention have the formula:

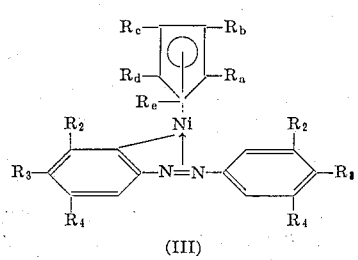

(III)

wherein $R_a$, $R_b$, $R_c$, $R_d$, $R_e$, $R_2$, $R_3$, and $R_4$ are independently selected from the class consisting of hydrogen and hydrocarbon radicals having from 1 to about 8 carbon atoms, said hydrocarbon radicals being selected from the class consisting of alkyl, cycloalkyl, aryl, alkaryl, and aralkyl radicals; such that the cyclopentadienyl radical has from 5 to about 13 carbon atoms, and each phenyl radical has from 6 to about 14 carbon atoms.

The novel compounds provided by this invention are prepared by a process which comprises reacting a di-(cyclomatic) nickel compound, QNiQ, wherein Q is a cyclomatic radical having the carbocyclic ring found in cyclopentadiene, with an azobenzene compound,

wherein Q' is a phenyl radical having from 6 to about 14 carbon atoms. The azobenzene reactants employed in this process have the generic formula:

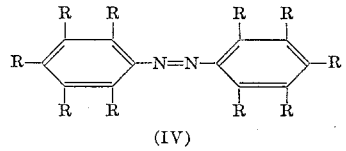

wherein the various R's are hydrogen or organic radicals and wherein at least one R bonded to a carbon atom ortho to the azo linkage is hydrogen. During the process, a hydrogen radical is removed from the azobenzene molecule and the azobenzene radical

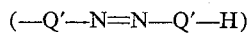

within the novel compounds is formed. Thus, the azobenzene reactant donates the azo linkage and the phenyl and o-phenylene radicals within the compounds provided by this invention.

The radicals represented by the various R's in Formulas I, II, and IV can be selected from a wide variety of organic radicals. Preferred radicals are of such nature, size, and configuration that they do not unduly inhibit the formation of the novel compounds. Such radicals are illustrated by hydrogen, halogen, carboxy, hydroxy, and hydrocarbon radicals. Preferred radicals are selected from the class consisting of hydrocarbon radicals having from 1 to about 8 carbon atoms selected from the class consisting of alkyl, cycloalkyl, alkaryl, aralkyl, and aryl radicals.

Preferred azobenzene reactants are symmetrical; that is, the radicals bonded to each of the phenyl radicals therein are identical and identically oriented in relation to the azo linkage. If a non-symmetrical azobenzene is employed, the o-phenylene radical derived from the phenyl radical from which a hydrogen is more readily abstracted, will from first. In practice, a mixture of products is usually prepared. The mixture will contain products having o-phenylene radicals derived from each of the phenyl radicals within the azobenzene reactant. In most instances, the product containing the most readily obtainable o-phenylene radical will predominate.

The azobenzene reactant must have at least one carbon atom ortho to the azo linkage bonded to hydrogen. The preferred reactants, being symmetrical in nature, have at least two ortho carbon atoms bonded to hydrogen. In the most preferred azobenzenes, all four carbons ortho to the azo linkage are bonded to hydrogen. These compounds can be illustrated by the formula:

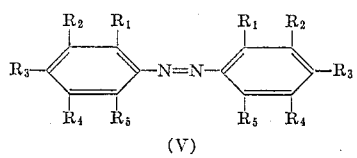

wherein $R_2$, $R_3$, and $R_4$ are independently selected from the class consisting of hydrogen and hydrocarbon radicals having from 1 to about 8 carbon atoms, said hydrocarbon radicals being selected from that class such that each phenyl radical has from 6 to about 14 carbon atoms, and $R_1$ and $R_5$ are hydrogen. In the formula, the subscripts indicate that the compound is symmetrical. As illustrated by the formula, the most preferred azobenzene reactants can be unsubstituted or contain mono-, di-, or tri-hydrocarbyl substituted phenyl radicals. In any case, it is preferred that the total number of carbon atoms in the substituted phenyl radicals does not exceed about 14. Azobenzene compounds satisfying this criterion readily afford the compounds provided by this invention.

Suitable azobenzene reactants containing the preferred radicals are illustrated by azobenzene, 3,4,5,3',4',5'-hexamethylazobenzene; 3,3' - diisopropylazobenzene; 4,4' - di-tert-butylazobenzene; 3,5,3',5' - tetra-n-butylazobenzene; 3,3'-dimethyl; 4,4'-diphenylazobenzene; 4,4'-di-o-tolylazobenzene; 3,3'-dicyclohexylazobenzene; 4,4' - di - β-phenylethylazobenzene, and the like.

Besides the nickel atom, the cyclopentadienyl radical in the novel compounds is derived from the dicyclopentadienyl nickel reactant. Hence, the choice of this reactant governs the nature of the cyclopentadienyl radical in the compounds provided by the process.

The dicyclopentadienyl nickel reactant is a nickelocene (or di-(cyclomatic) nickel compound) having the formula:

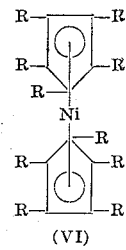

wherein the various R's are hydrogen or organic radicals. The radicals indicated by the R's in Formula VI can be selected from a wide variety of substituents such as hydrogen, halogen, hydrocarbon radicals, carboxy and hydroxy groups and the like. The preferred radicals are those whose nature, size and configuration do not unduly inhibit the formation of the compounds of this invention. The more preferred radicals are hydrogen, halogen, and hydrocarbon radicals. The most preferred substituents are hydrogen and hydrocarbon radicals having one to about eight carbon atoms.

Illustrative but not limiting examples of preferred hydrocarbon radicals are methyl, ethyl, isopropyl, tert-butyl, isooctyl, cyclohexyl, cyclohexylethyl, benzyl, xylyl, mesityl, α-cumenyl, β-phenylethyl, and the like. Radicals of this type are preferred since they are unaltered during the course of the process of this invention.

More than one substituent (other than hydrogen) of the type described above may appear on the cyclopentadienyl radicals within the nickelocene reactant. Disubstituted rings are the most preferred multi-substituted cyclopentadienyl radicals. Preferred nickelocene reactants have at least one hydrogen bonded to each cyclopentadienyl ring. These compounds have the following formula:

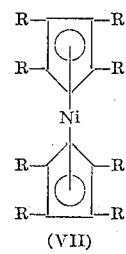

wherein the R's have the same significance as in Formula VI. Preferably, the cyclomatic radicals within the nickelocene reactants have up to about 13 carbon atoms. In other words, the total number of carbon atoms within the various substituents appended to the ring preferably does not exceed about eight.

Preferred nickelocene reactants are symmetrical compounds; that is, each cyclopentadienyl radical has the same substituents and the substituents are identically oriented about the rings. Generally, the symmetrical compounds are more readily available and give higher yields of the novel compounds than the unsymmetrical analogs.

When a non-symmetrical nickelocene is employed, the cyclomatic radical which is more readily removed will be abstracted first. In practice a mixture of products is usually prepared. The mixture will contain products having cyclopentadienyl radicals derived from each of the cyclopentadienyl radicals within the nickelocene reactant. In most instances, the product containing the cyclopentadienyl radical which is more strongly bonded to the nickel atom (and which is less readily removed therefrom) will predominate.

Preferred symmetrical nickelocenes have the formula:

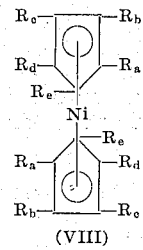

(VIII)

wherein $R_a$, $R_b$, $R_c$, $R_d$, and $R_e$, are selected from the class consisting of hydrogen and hydrocarbon radicals having from 1 to about 8 carbon atoms selected from the class consisting of alkyl, cycloalkyl, aryl, alkaryl, and aralkyl radicals.

Illustrative but not limiting examples of preferred dicyclopentadienyl nickel compounds which are applicable in this process are di(cyclopentadienyl) nickel, di(methylcyclopentadienyl) nickel, di(isopropylcyclopentadienyl) nickel, di(tert-butylcyclopentadienyl) nickel, di(phenylcyclopentadienyl) nickel, di(cyclohexylcyclopentadienyl) nickel, di(benzylcyclopentadienyl) nickel, di(2,3-dimethylcyclopentadienyl) nickel, di(2,3,4,5 - tetramethylcyclopentadienyl) nickel, di(2-phenyl - 4 - phenylcyclopentadienyl) nickel, di(2-o-tolyl-5-methylcyclopentadiencyl) nickel, and the like. The most preferred nickelocene reactant is the parent compound, di(cyclopentadiencyl) nickel.

Illustrative unsymmetrical nickelocenes which can be employed in this process include (cyclopentadienyl) nickel (methylcyclopentadienyl), (isopropylcyclopentadienyl) nickel (2,3-dimethylcyclopentadienyl), (2-phenyl-3-ethylcyclopentadienyl) nickel, (1,2-di-tert-butylcyclopentadienyl) and the like.

Some radicals are reduced during the process of this invention. As illustrated by the equation below, a hydrogen radical is abstracted from one of the phenyl rings within the azobenzene reactant. In some instances, the nascent hydrogen produced will alter a susceptible radical. For example, under certain conditions, alkenyl and keto radicals are reduced to alkyl and hydroxy radicals respectively. Aryl, alkaryl, and aralkyl radicals are impervious to the reducing conditions existent in this process.

Although not bound by any theory, the process of this invention can be illustrated by the following equation for the preparation of cyclopentadienyl nickel azobenzene.

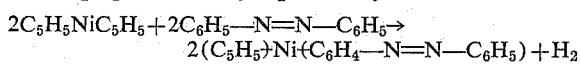

As illustrated by the equation, the nickelocene and the azobenzene reactant combine in equimolar proportions. Although the reaction can be carried out using equivalent quantities of both reactants, it is not necessary to do so. An excess of either reactant can be employed if desired. Frequently, an excess of a reactant tends to force the reaction to completion and, thus, affords a higher yield of product. Usually from about one to about 15 moles of the nickelocene are employed for each mole of azobenzene. Similarly, from one to about 15 moles of azobenzene can be employed for each mole of the nickelocene reactant.

The process of this invention proceeds well provided that the nickelocene and azobenzene reactants are sufficiently contacted. As illustrated by Example 2 below, merely heating a mixture of the reactants to the desired reaction temperature is sufficient to carry out the process of this invention. As demonstrated by Example 2, when this expedient is employed, the reaction mixture may solidify. The desired product can be obtained from the solid residue by trituration with a solvent of the type described below.

A solvent can be employed in the process. However, a solvent is not necessary. Generally, a non-reactive organic solvent is preferred. A preferred solvent readily dissolved the reactants, has a high heat capacity and can be readily separated from the product and unused reactants, and is chemically inert to the reactants and products. From a practical viewpoint, satisfactory results are obtained when hydrocarbon solvents such as individual paraffins, mixtures thereof, individual aromatic hydrocarbons, and mixtures thereof, are employed. Illustrative but not limiting examples of solvents which can be employed in this process are isooctane, decane, petroleum ether, benzene, xylene, ethylbenzene, gasoline, kerosene, and the like. Other non-reactive organic solvents such as chlorinated hydrocarbons may also be employed.

The reaction pressure is not critical. Satisfactory results are obtained when the process is carried out at atmospheric pressure. However, higher and lower pressures can be employed if desired. Superatmospheric pressures are desirable when solvents having low boiling points, e.g., hexane, are employed.

The reaction temperature is not critical. It is preferred that the reaction temperature be sufficient to cause the reaction to proceed at a desirable rate, but not so high as to cause decomposition of the products and reactants. Generally, the process is carried out at a temperature between 50° and 300° C. The preferred temperature is within the range of 110° to 250° C.

The reaction time is generally not an independent variable but is dependent upon the other conditions employed and the reactivity of the reactants. For example, the reaction time can be extended if low temperatures are employed, and will be reduced if the process is carried out at a higher temperature. It is preferred that the reaction conditions be selected so that the reaction time be within the range of about one hour to about one or two days. The preferred reaction times are 3 to 18 hours.

Generally, the process is carried out in the presence of an inert atmosphere. Inert gases such as nitrogen, argon, helium, and the like can be employed. Because it is inexpensive and readily available, nitrogen is the inert gas of choice.

Generally, the compounds of this invention are colored crystalline solids. They may be separated from the reaction mixture and subsequently purified by processes familiar to those skilled in the art. Examples of suitable processes are removal of the solvent by distillation and then separation of the product by crystallization, sublimation, chromatography and the like.

The following examples are presented to further illustrate the compounds of this invention and the process for their formation. All parts are by weight unless otherwise noted.

*Example 1*

A solution of 20 parts of azobenzene and parts of nickelocene in 225 parts of xylene was refluxed overnight under nitrogen. After cooling, the solvent was removed by distillation at 70–100° C. and at full pump vacuum, and the residue was chromatographed on alumina. A purple band was obtained and this was eluted with benzene-hexane (1:3, volume:volume) and this solution reapplied to an alumina column. After a second elution with benzene-hexane (1:3, volume:volume), 3.34 parts of product, M.P. 112–115° C., was obtained. This product was recrystallized several times from petroleum ether by dissolving the product in that solvent and cooling the solution sufficiently to cause crystallization. A petroleum ether solution of the product was rechromatographed on an alumina column and then recrystallized from petroleum ether as described above. The melting point of the pure product, cyclopentadienyl nickel azobenzene, was 118–119° C. Calculated for $C_{17}H_{14}N_2Ni$; C, 66.9; H, 4.63; Ni, 19.2; M.W. 305. Found: C, 66.7; H, 4.69; Ni, 19.1; M.W. 310 (Signer method). Magnetic susceptibility studies demonstrate that the material is diamagnetic.

The N.M.R. spectrum of the product possesses a group of four resonances relative to tetramethylsilane, at —5.33 (singlet), —6.92 (triplet), —7.93 (quadruplet), and —8.15 (doublet) p.p.m., with respective ratios of 4.8:2.2:6.7:1. The singlet at —5.33 p.p.m., corresponding to five hydrogens, is characteristic of hydrogens on a cyclopentadienyl ring π-bonded to nickel. The remaining resonances are a complex phenyl hydrogen type. This is proof that the nickel has achieved the electronic structure of the next higher inert gas. The presence of a nickel-carbon bond was determined by reduction of the cyclopentadienyl nickel azobenzene product with lithium aluminum deuteride. The product had an infrared spectrum similar to that of azobenzene. The product contained approximately 10% deuterium by mass spectral analysis of the water formed by decomposition of the product.

The ultraviolet absorption spectrum of the product has maxima at 252, 268, 345, and 585 m$\mu$, with respective molar extinction coefficients of 14,000, 13,050, 7550 and 6200 (95% ethanol). This contrasts with the spectrum of azobenzene which has maxima at 230, 318, and 440 m$\mu$ with molar extinctions of 8370, 19,500, and 587. The loss of absorption in the 318 m$\mu$ region, attributed to the conjugation of the unsaturated nitrogen with the phenyl rings, demonstrates that the nitrogen system in the complex is bonded to nickel in a manner shown in the structure below, and this bonding allows nickel to attain rare gas structure.

Steric requirements dictate that the nickel atom be bonded to a carbon atom in the azobenzene radical which is ortho to the azo linkage. On the basis of the above evidence, the product was assigned the formula

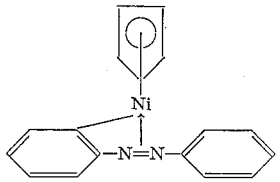

Besides the name "cyclopentadienyl nickel azobenzene," the product is also correctly designated as "cyclopentadienyl[o-(phenylazo)phenyl]nickel."

Similar results were obtained when a solution of four parts of nickelocene and two parts of azobenzene in 80 parts of toluene was refluxed for approximately three days.

Example 2

A mixture of one part of nickelocene and 3 parts of azobenzene was heated at 110–115° C. for two hours and then at 135° C. for three hours. The mixture, originally liquid, solidified into a black mass. The solid mass was triturated with benzene-petroleum ether (1:3, volume:volume) and the soluble material was chromatographed. The product, cyclopentadienyl nickel azobenzene—cyclopentadienyl[o - (phenylazo)phenyl]nickel—was recrystallized from petroleum ether at —70° C. The melting point of the pure product was 117.5–119° C.

Analysis found: C, 67.6; H, 4.65; N, 8.66; Ni, 18.8. (Calculated: N, 9.27.)

Example 3

Following the procedure of Example 1, di(isobutylcyclopentadienyl) nickel is reacted with 4,4'-dimethylazobenzene. The product is isobutylcyclopentadienyl nickel,4,4' - dimethylazobenzene—isobutylcyclopentadienyl[o - (4 - methylphenylazo) - 4 - methylphenyl]-nickel.

Similarly, di(octylcyclopentadienyl) nickel is reacted with 3,3'-diisopropylazobenzene. The product is octylcyclopentadienyl nickel 3,3' - di(isopropyl)azobenzene—(octylcyclopentadienyl[o - (3 - isopropylphenylazo) - 3-isopropylphenyl]nickel. In like manner, the compound phenylcyclopentadienyl nickel 4,4' - diphenylazobenzene —phenyl cyclopentadienyl[o - (4 - phenylphenylazo) - 4-phenylphenyl]nickel—is prepared by reacting di(phenylcyclopentadienyl)nickel with 4,4'-diphenylazobenzene.

Example 4

Following the procedure of Example 2, the compound 3,4,5,3',4',5'-hexylethylazobenzene is reacted with di(cyclohexylcyclopentadienyl) nickel. The product is cyclohexylcyclopentadienyl nickel 3,4,5,3',4',5'-hexylethylazobenzene—cyclohexylcyclopentadienyl[o-(3,4,5 - triethylphenylazo)-3,4,5-triethylphenyl]nickel.

Similarly, the product of the reaction of di(2,3-dimethylcyclopentadienyl) nickel and 3,3'-di-o-tolylazobenzene is 2,3-dimethylcyclopentadienyl nickel 3,3'-di-o-tolylazobenzene—2,3 - dimethylcyclopentadienyl[o-(tolylphenylazo)-3-tolylphenyl]nickel.

The compound 2,3,4,5 - tetramethylcyclopentadienyl nickel azobenzene—2,3,4,5 - tetramethylcyclopentadienyl [o-(phenylazo)phenyl]nickel—is prepared by reacting di(2,3,4,5-tetramethylcyclopentadienyl) nickel with azobenzene.

The compound β-phenylethylcyclopentadienyl nickel 3,3' - β-phenylethylazobenzene—β-phenylethylcyclopentadienyl[o-(3 - β-phenylethylphenylazo) - 3-β-phenylethylphenyl]nickel—is prepared by reacting di(β-phenylethylcyclopentadienyl)nickel with 3,3'-di-β-phenylethylazobenzene.

Example 5

Azobenzene is reacted with (cyclopentadienyl) nickel (ethylcyclopentadienyl) at 150° C. The product is a mixture of cyclopentadienyl[o-(phenylazo)phenyl]nickel and ethylcyclopentadienyl[o-(phenylazo)phenyl]nickel. Similar results are obtained when benzene is employed as a solvent.

Example 6

Dicyclopentadienyl nickel is reacted with 4-ethyl-4'-methylazobenzene according to the procedure of Example 1. The product is a mixture of cyclopentadienyl[o-(4-ethylphenylazo)-4-methylphenyl]nickel and cyclopentadienyl[o - (4-methylphenylazo)-4-ethylphenyl]nickel. In a similar manner, dicyclopentadienyl nickel is reacted with 3-methyl-4'-propylazobenzene. The product is a mixture of cyclopentadienyl[o-(3-methylphenylazo)-4-propylphenyl]nickel and cyclopentadienyl[4-(propylphenylazo)-3-methylphenyl]nickel.

Example 7

(Cyclopentadienyl) nickel methylcyclopentadienyl is reacted with 2-tolyl-3'-ethylazobenzene according to the procedure of Example 1. The product is a mixture of cyclopentadienyl[o - (2 - tolylphenylazo)-3-ethylphenyl] nickel, cyclopentadienyl[o - (3 - ethylphenylazo)-2-tolylphenyl]nickel, methylcyclopentadienyl[o-(2-tolylphenylazo)-3-ethylphenyl]nickel, and methylcyclopentadienyl [o-(3-ethylphenylazo)-2-tolyphenyl]nickel.

The organometallic compounds of this invention are useful as additives to hydrocarbon fuels and lubricants. For example, when added to a hydrocarbon fuel of the gasoline boiling range, many of the compounds are found to increase the octane number of the fuel. The compounds may be added to gasoline along with halo-hydrocarbon scavengers such as ethylene dichloride and ethylene dibromide, phosphorus ignition control compounds such as tricresyl phosphate, and other antiknock agents such as tetraethyllead, methylcyclopentadienyl manganese tricarbonyl, and the like. The compounds are also useful as additives to residual and distillate fuels such as jet fuels, home heater fuels, and diesel fuels to reduce smoke and/or soot formation. In addition, the compounds may be employed as additives to solid propellants to control the burning rate. Still further use for the compounds is as ultraviolet light absorbers.

The compounds may also be used as metal sources in metal plating operations. When so employed, the compounds are decomposed at elevated temperatures so as to lay down a metal-containing film on a substrate material. Preferably, the film-forming operation is carried out in the presence of a reducing gas such as hydrogen or an inert gas such as nitrogen so as to prevent oxidation of the substrate material or the film during the film-forming operation. The metal-containing films serve a number of useful and desirable purposes. Thus, they may be employed to produce a decorative effect on the substrate material, to serve as a protective coating or to form a conductive surface. In the latter application, the compounds can be employed in forming printed circuits by decomposing the organometallic compound so that it lays down an electrically conductive metal-containing film on selected portions of the substrate material. This is conveniently accomplished by first covering the substrate material with a stencil and then conducting the plating operation so as to form a film on those portions of the substrate material which are not covered by the stencil.

The novel compounds are also useful as chemical intermediates, pharmaceuticals such as anti-carcinogenic agents, and biocides such as fungicides, herbicides, and pesticides.

Having fully described this invention, it is intended that it be limited only within the spirit and scope of the following claims.

We claim:

1. An organometallic compound having the formula

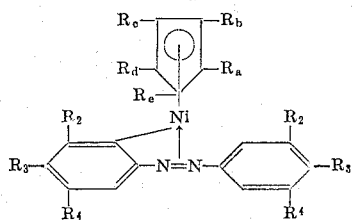

wherein $R_a$, $R_b$, $R_c$, $R_d$, $R_e$, $R_2$, $R_3$, and $R_4$ are independently selected from the class consisting of hydrogen and hydrocarbon radicals having from 1 to about 8 carbon atoms, said hydrocarbon radicals being selected from the class consisting of alkyl, cycloalkyl, aryl, alkaryl, and aralkyl radicals; such that the cyclopentadienyl radical has from 5 to about 13 carbon atoms, and each phenyl radical has from 6 to about 14 carbon atoms.

2. Cyclopentadienyl nickel azobenzene having the formula

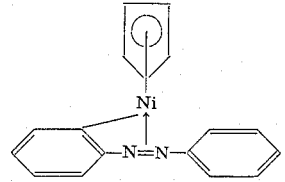

3. Process for the preparation of an organometallic compound having the formula

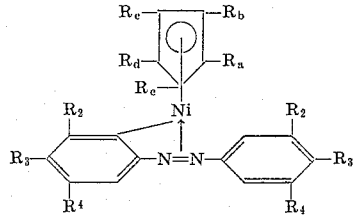

wherein $R_a$, $R_b$, $R_c$, $R_d$, $R_e$, $R_2$, $R_3$, and $R_4$ are selected from the class consisting of hydrogen and hydrocarbon radicals having from one to about 8 carbon atoms, said hydrocarbon radicals being selected from the class consisting of alkyl, cycloalkyl, aryl, alkaryl, and aralkyl radicals; such that the cyclopentadienyl radical has from 5 to about 13 carbon atoms, and each phenyl radical has from six to about 14 carbon atoms; said process comprising reacting the corresponding symmetrical azobenzene with the corresponding symmetrical nickelocene at a temperature of from about 50° C. to about 300° C..

4. The process of claim 3 carried out in the presence of a non-reactive organic solvent.

5. The process of claim 3 carried out in the absence of a solvent.

6. The process of claim 3 being carried out in the presence of an inert atmosphere and at a temperature of from about 110° to about 250° C.

7. Process for the preparation of the compound of claim 2, said process comprising reacting di-(cyclopentadienyl) nickel with azobenzene at a temperature within the range of 50° C. to 300° C.

8. The process of claim 7 carried out in the absence of a solvent.

9. The process of claim 7 carried out in the presence of a non-reactive organic solvent.

10. The process of claim 9 wherein said solvent is xylene.

11. The process of claim 9 wherein said solvent is toluene.

No references cited.

CHARLES B. PARKER, *Primary Examiner.*

F. D. HIGEL, *Assistant Examiner.*